United States Patent [19]

Puetz

[11] Patent Number: 4,848,932
[45] Date of Patent: Jul. 18, 1989

[54] GAS-STATIC AND GAS-DYNAMIC BEARING

[75] Inventor: Heinrich Puetz, Much, Fed. Rep. of Germany

[73] Assignee: Interatom GmbH, Bergisch Gladbach, Fed. Rep. of Germany

[21] Appl. No.: 227,752

[22] Filed: Aug. 3, 1988

[30] Foreign Application Priority Data

Aug. 3, 1987 [DE] Fed. Rep. of Germany ....... 3725675

[51] Int. Cl.$^4$ .............................................. F16C 32/16
[52] U.S. Cl. .................................... 384/113; 384/119;
384/279
[58] Field of Search ................. 384/13, 115, 119, 121,
384/107, 279, 902

[56] References Cited

U.S. PATENT DOCUMENTS

| 3,374,039 | 3/1968 | Voorhies | 384/279 |
| 3,527,510 | 9/1970 | Christiansen | 384/279 |
| 4,013,326 | 3/1977 | King | 384/113 |
| 4,348,066 | 9/1982 | Agrawal et al. | |
| 4,355,850 | 10/1982 | Okano | |

FOREIGN PATENT DOCUMENTS

| 0212091 | 3/1987 | European Pat. Off. |
| 2349072 | 3/1975 | Fed. Rep. of Germany |
| 3230232 | 10/1987 | Fed. Rep. of Germany |
| 1118366 | 7/1968 | United Kingdom |

Primary Examiner—Lenard A. Footland
Attorney, Agent, or Firm—Herbert L. Lerner; Laurence A. Greenberg

[57] ABSTRACT

A gas-static and gas-dynamic radial bearing assembly includes a shaft having a supply line extending in the interior thereof for bearing gas. The shaft has a portion in the form of a porous sintered body. A bearing has a given bearing length, part of which is occupied by the porous sintered body. The bearing has a bearing box divided into individual segments partly overlapping one another at given regions. Spring elements in the vicinity of said given regions spread said segments apart.

5 Claims, 1 Drawing Sheet

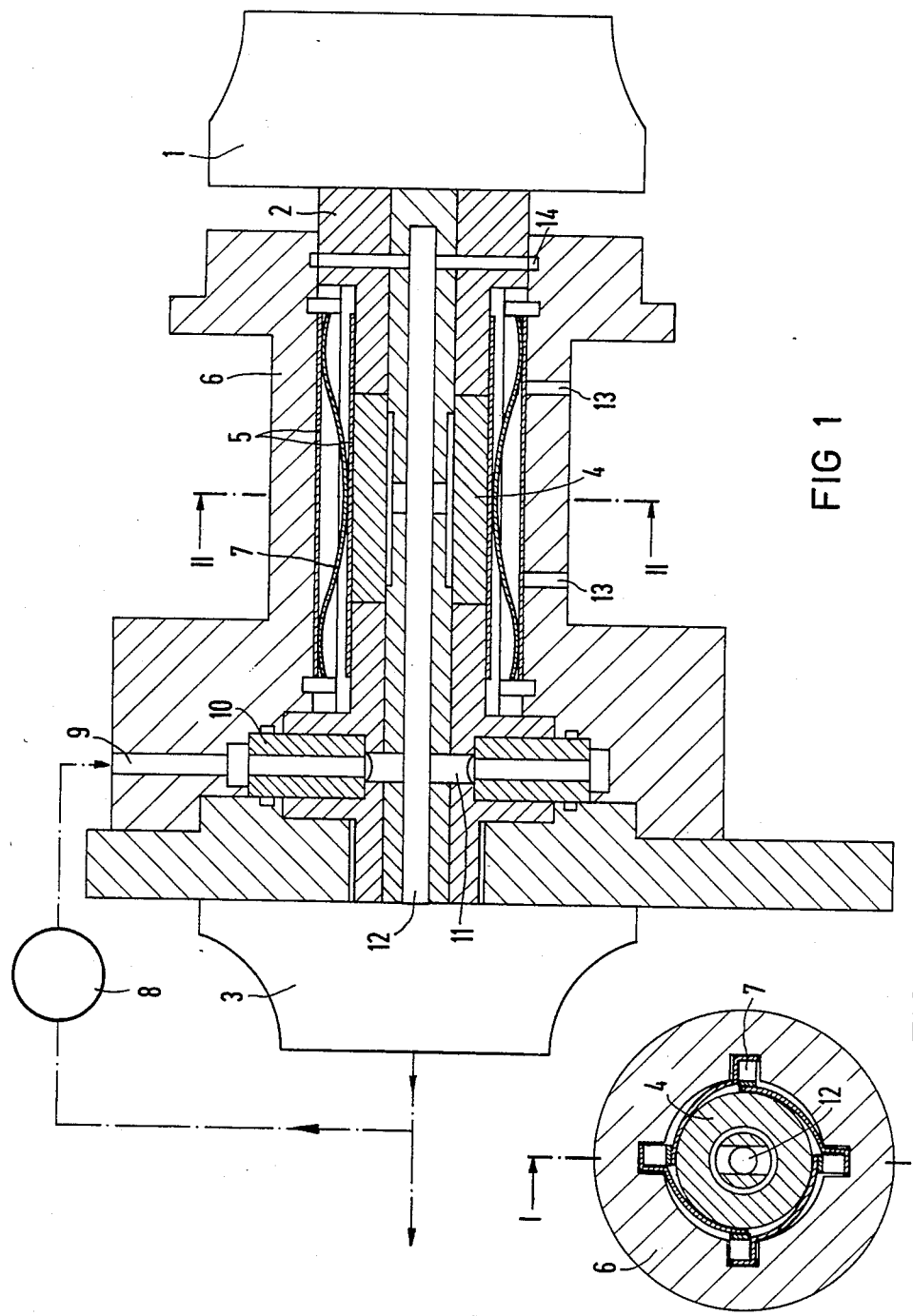

GAS-STATIC AND GAS-DYNAMIC BEARING

The invention relates to a gas-static and gas-dynamic radial bearing.

German Patent DE-PS No. 32 30 232 discloses a bearing box for a gas-static bearing and a method for the manufacture thereof, in which the bearing box is formed of a porous material (for instance a sintered material) and is compressed more severely on the inside thereof, so that the throttling function of the bearing box is performed only by this surface layer. Such bearings can already be operated at relatively low gas pressures, such as those brough to bear by turbochargers used to boost the power of internal combustion engines. Due to this as well as other advantages, European Patent Application No. 0 212 091 proposes the use of such bearings in turbochargers.

In these and other applications, where the bearings are to be operated over a wide temperature range, it has been found that the temperature dictated changes in the dimensions of the bearing boxes and shafts, which necessarily must be manufactured from different materials, cause changes in the gap width, which has an unfavorable effect on the properties of the bearing in some circumstances. The inherently unstable operation of such bearings has not been previously overcome but only shifted (for example by means of suitable damping) to an rpm that is outside the usual operating rpm range. It is known to prevent such instability by dividing the bearing box into a plurality of segments that are movable relative to one another and relative to the shaft. However, applying this structure to gas-static bearings presents difficulties.

It is accordingly an object of the invention to provide a gas-static and gas-dynamic bearing, which overcomes the herein-aforementioned disadvantages of the heretofore-known devices of this general type, which can be operated even at severely changing temperatures and which has a stable operation. It is also an object of the invention to provides embodiments of such a bearing that improve its suitability for use in turbochargers.

With the foregoing and other objects in view there is provided, in accordance with the invention, a gas-static and gas-dynamic radial bearing assembly, comprising a shaft having a supply line extending in the interior thereof for bearing gas, the shaft having a portion in the form of a porous sintered body; a bearing with a given bearing length, the porous sintered body occupying part of the given bearing length; the bearing having a bearing box divided into individual segments partly overlapping one another at given regions, and spring elements in the vicinity of the given regions spreading the segments apart.

Since it is no longer the bearing box but rather the shaft that contains the porous body acted upon from the inside with gas pressure, not only is the manufacturing process facilitated (because it is easier to machine an outer surface, especially for small diameters, than an inner surface), but also the bearing box can then be readily divided into individual segments. Since the portion of the shaft made from a porous material is only a portion of the bearing length, the remaining portion functions as a gas-dynamic bearing, which further improves the properties of stability of the bearing. Delivery of the bearing gas through the shift itself furthermore assures better cooling of the shaft and thus solves a further problem that arises in the operation of turbochargers. Since the segments of the bearing box are subjected to spring force, they can readily yield to the forces arising from temperature expansion and assure a bearing gap that is uniformly wide at all temperatures.

In accordance with another feature of the invention, there is provided a gas-static axial bearing. This assures a structural simplification of the entire bearing, because a separate axial bearing does not have to be provided.

In accordance with a further feature of the invention, there is provided a bearing gas supply conduit for the axial bearing discharging into the bearing gas supply line.

In accordance with an added feature of the invention, the bearing gas supply conduit leads into the bearing gas supply line at a given location, and there is provided an auxiliary turbine secured on the shaft upstream of the given location, as seen in gas flow direction in the bearing gas supply line.

This feature lends the shaft rotating within the bearing a kind of auxiliary drive, by means of which a minimum rpm is maintained even if the actual engine resting on the bearing is not supplied with energy. When this feature is applied to turbochargers for internal combustion engines, a better response behavior is obtained, because the bearing need not be accelerated each time from a standstill or from a very low rpm.

In accordance with a concomitant feature of the invention, the segments of the bearing box have long and short edges, and one of the long edges of the segments rest resiliently on the shaft. This feature allows the bearing box segments to follow the relative changes in dimension between them and the shaft more easily. At the same time, the dynamic component of the bearing support force is increased.

Other features which are considered as characteristic for the invention are set forth in the appended claims.

Although the invention is illustrated and described herein as embodied in a gas-static and gas-dynamic bearing, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

FIG. 1 is a diagrammatic, longitudinal, axial-sectional view taken along the line I—I of FIG. 2, in the direction of the arrows, showing an embodiment of the invention in the form of a turbocharger without a housing; and FIG. 2 is a cross-sectional view taken along the line II—II of FIG. 1, in the direction of the arrows.

Referring now in detail to the figures of the drawings as a whole, there is seen a turbine 1 which is driven by exhaust gases of a non-illustrated internal combustion engine and which drives a compressor 3 through a shaft 2. The compressor 3 provides charge air to be delivered to the engine. The shaft 2 has a bush 4 of a porous sintered metal over a portion of the length thereof, which is compressed on its outer surface, so that it functions as a throttle for the bearing gas, for instance air. A gas-static bearing is formed in cooperation with a bearing box 5. The bearing box 5 is formed of a plurality of individual segments of canted or bevelled sheet-metal strips, in this case four, which have one long side that rests on the bush or porous bearing body 4 and another long side which is set in indentations provided in a bearing case 6. The individual segments of the bearing box 5 overlap one another and are spread apart in this vicinity by spring elements 7. Both ends of the bearing box 5 extend over regions of the shaft 2 in which the shaft does not have any bushes or porous bearing bodies 4. In these regions, the bearing functions gas-dynamically. The fluid necessary for operation of the bearing may be drawn from any arbitrary source of compressed gas. However, as schematically shown, it may also be diverted from the charge air compressed by the compressor 3 and delivered to radial supply lines 9 in the case 6, after temporary storage in a pressure container 8. A further porous sintered body 10 of the type described above, which is part of a gas-static axial bearing, is also supplied and at the same time cooled through the supply lines or bores 9. The bearing gas from the supply lines 9 then acts upon an auxiliary turbine 11 which is mounted on the shaft 2, by means of which the first turbine rotates continuously at a minimum rpm. The bearing gas is then delivered through a central supply line 12 disposed in the shaft 2 to the bush or bearing body 4, from where it escapes through venting bores 13. Sealing gas seals 14 can also be operated with part of the flow.

The foregoing is a description corresponding in substance to German Application No. P 37 25 675.0, dated Aug. 3, 1987, the International priority of which is being claimed for the instant application, and which is hereby made part of this application. Any material discrepancies between the foregoing specification and the aforementioned corresponding German application are to be resolved in favor of the latter.

I claim:

1. Gas-static and gas-dynamic radial bearing assembly, comprising:
   (a) a shaft having a supply line extending in the interior thereof for bearing gas, said shaft having a portion in the form of a porous sintered body;
   (b) a bearing with a given bearing length, said porous sintered body occupying part of said given bearing length;
   (c) said bearing having a bearing box divided into individual segments partly overlapping one another at given regions, and spring elements in the vicinity of said given regions spreading said segments apart.

2. Bearing assembly according to claim 1, including a gas-static axial bearing.

3. Bearing assembly according to claim 2, including a bearing gas supply conduit for said axial bearing discharging into said bearing gas supply line.

4. Bearing assembly according to claim 3, wherein said bearing gas supply conduit leads into said bearing gas supply line at a given location, and including an auxiliary turbine secured on said shaft upstream of said given location, as seen in gas flow direction in said bearing gas supply line.

5. Bearing assembly according to claim 1, wherein said segments of said bearing box have long and short edges, and one of said long edges of said segments rest resiliently on said shaft.

* * * * *